United States Patent [19]

Noirot et al.

[11] Patent Number: 5,653,105
[45] Date of Patent: Aug. 5, 1997

[54] DEVICE FOR THE TREATMENT OF THE EXHAUST GASES OF A SPARK-IGNITION ENGINE COMPRISING A CATALYST BODY AND A HYDROCARBONS ADSORBER PLACED IN AN EXHAUST MANIFOLD

[75] Inventors: Rémi Noirot; Jean-Michel Bart, both of Courbevoie, France

[73] Assignees: Automobiles Peugeot, Paris; Automobiles Citroen, Neuilly sur Seine, both of France

[21] Appl. No.: 574,235

[22] Filed: Dec. 18, 1995

[30] Foreign Application Priority Data

Dec. 19, 1994 [FR] France .................. 94 15265

[51] Int. Cl.$^6$ ......................... F01N 3/28
[52] U.S. Cl. ............... 60/297; 60/302; 422/169
[58] Field of Search .............. 60/297, 302; 422/169

[56] References Cited

U.S. PATENT DOCUMENTS

| | | |
|---|---|---|
| 4,047,895 | 9/1977 | Urban . |
| 4,087,966 | 5/1978 | Akado et al. . |
| 4,663,934 | 5/1987 | Sickels ............................ 60/302 |
| 5,388,407 | 2/1995 | Capers ............................ 60/302 |
| 5,493,859 | 2/1996 | Shinohara ....................... 60/297 |

FOREIGN PATENT DOCUMENTS

| | | |
|---|---|---|
| 2209399 | 6/1974 | France . |
| 3 928 760 | 3/1990 | Germany . |
| WO86/04525 | 8/1986 | WIPO . |

*Primary Examiner*—Douglas Hart
*Attorney, Agent, or Firm*—Burns, Doane, Swecker & Mathis, L.L.P.

[57] ABSTRACT

The device comprises, inside a cylindrical case (3) of the exhaust manifold (2), a catalyst body (12) in a central position and means (14) for adsorbing hydrocarbons in a peripheral position around the catalyst body (12). Preferably, the catalyst body (12) is disposed in an exhaust pipe (8) constituting an end part of an exhaust line (8a) and the adsorption means (14) is disposed in a peripheral annular space between the pipe (8) and the inner surface of the case (3) of the manifold.

20 Claims, 5 Drawing Sheets

DEVICE FOR THE TREATMENT OF THE EXHAUST GASES OF A SPARK-IGNITION ENGINE COMPRISING A CATALYST BODY AND A HYDROCARBONS ADSORBER PLACED IN AN EXHAUST MANIFOLD

The invention relates to a device for the treatment of the exhaust gases of a spark-ignition engine of an automobile vehicle for eliminating as far as possible the hydrocarbons contained in the exhaust gases of the engine.

The exhaust gases of spark-ignition engines or petrol or gasoline engines contain various pollutants whose discharge into the atmosphere must be limited as far as possible. These pollutants mainly consist of carbon monoxide CO, unburnt hydrocarbons HC and nitrogen oxides $NO_x$.

Regulations concerning the standards of pollution of automobile vehicles tend to become more and more strict so that the upper limits of the discharge of the various pollutants tend to become progressively lower in the new regulations.

In order to limit the discharge of polluting substances into the atmosphere, vehicles having a petrol engine must be provided with a catalytic silencer in which the polluting substances of the exhaust gases are subjected to an oxidation or a catalytic reduction which converts them into non-polluting gaseous substances such as carbon dioxide $CO_2$, water vapour or nitrogen. At the present time there are employed in the catalytic silencers of vehicles having a petrol engine catalysts which effect the catalytic oxidation of the carbon monoxide and the hydrocarbons and the reduction of the nitrogen oxides. These catalysts are termed three-way catalysts.

The catalysts employed in catalytic silencers correctly perform their function only when they are brought to a minimum temperature which may be for example between 250° and 350° C. and is preferably around 300° C. at which temperature the catalysts generally employed permit achieving a rate of conversion of the polluting substances of the order of 90%.

The catalyst material disposed in the path of the gases in the exhaust line of the vehicle is generally only heated by the passage of the exhaust gases of the engine so that it is substantially inactive when starting up the engine and during a certain period of time following the starting up.

In the case of standardized tests of three-way catalytic silencers (ECE standardized), the period for initiating the catalyst is about 120 seconds after starting up. It has been observed by measurements of cumulated emissions of polluting substances that, during this lapse of time, there are emitted about 90% of the total amounts of CO emitted in the course of the test, 75% of the amounts of hydrocarbons and 50% of the amounts of nitrogen oxides.

The catalytic silencers in which the catalyst is heated solely by the exhaust gases are therefore unsatisfactory and do not meet the requirements fixed by the anti-pollution standards which will come into force in a few years time.

It has therefore been attempted to reduce the time required to initiate catalysts by limiting losses of heat along the exhaust line, by moving the catalytic silencer closer to the engine, or by employing an auxiliary device for preheating the catalyst, such as a gas burner or an electric heater.

It has also been envisaged, in particular for reducing the emissions of hydrocarbons, to put the exhaust gases of the engine in contact with materials having properties of adsorption of polluting substances and more particularly hydrocarbons. Such materials may be formed for example by a zeolite or activated carbon.

The principle of operation of adsorbers of polluting substances and in particular hydrocarbons is based on the property of the physical adsorption of a substance such as the hydrocarbons by the adsorber, so long as the temperature of the adsorber and the exhaust gases remains below a certain limit.

In a first phase, the polluting substance is trapped by the adsorber material by a physical or physico-chemical adsorption phenomenon.

In a second phase, there is produced by the action of the temperature a desorption of the polluting substance which is entrained by the exhaust gases in such manner as to come into contact with the catalyst. The rate of desorption of the polluting substance depends in particular on the concentration of the polluting substance in the exhaust gases and on the temperature of the gases. To obtain optimum efficiency of the process of the treatment of the gases with adsorption of one or more polluting substances, it is necessary to arrange that the polluting substance or substances are retained on the trap by adsorption right from the ambient temperature and are released by desorption at a temperature higher than or equal to the catalyst initiation temperature.

In the exhaust lines including a catalytic silencer employing a pollutant substance adsorber, the adsorber is placed on the upstream side of the catalyst so that a part of the thermal energy conducted by the exhaust gases is dissipated inside the trap comprising the polluting substance adsorber. Consequently, the temperature of the adsorption material is liable to rise rapidly whereas the temperature of the catalyst rises more slowly than in a catalytic silencer devoid of an adsorption material. The time during which the polluting substances stay in the trap is therefore usually too short and the time for initiating the catalyst is increased so that the polluting substances are liable to be released by desorption before the catalyst is active.

In order to improve the operation of the catalytic silencer, devices for the treatment of exhaust gases have been proposed which comprise a trap filled with adsorption material and one or more catalytic silencers disposed in succession in the path of the gases in the exhaust line. A by-pass pipe around the adsorption trap and an alternating opening and closing valve in the by-pass pipe and in the main pipe of the exhaust line permit an operation in two phases, the exhaust gases passing through in succession the adsorption material and the catalyst material in a first phase, and coming into contact solely with the catalyst material in a second phase after the catalyst material has been brought to the required temperature. In such a device, the rate at which the adsorption material is heated remains high and the rate at which the temperature of the catalyst is brought to the right value remains lower than the rate at which the catalyst of a catalytic silencer devoid of adsorbent material is heated.

Internal combustion engines such as petrol or gasoline engines may comprise an exhaust manifold which has a cylindrical case into which open, in a substantially tangential direction, the exhaust pipes of the cylinders of the engine. At least one of the longitudinal ends of the exhaust manifold is connected to an exhaust line of the automobile vehicle.

Owing to the fact that the exhaust gases reach the interior of the manifold directly as they leave the engine with low thermal losses, it may be advantageous to place the three-way catalyst inside the manifold.

Such arrangements have already been proposed. However, it has never been proposed to place in the manifold of an internal combustion engine both a treatment catalyst and an adsorber of polluting substances such as hydrocarbons.

An object of the invention is therefore to provide a device for the treatment of exhaust gases of a spark-ignition engine of an automobile vehicle comprising at least one catalyst body disposed inside an exhaust manifold of the engine having a case of cylindrical shape into which opens, in a substantially tangential direction, at least one exhaust pipe communicating with a cylinder of the engine, said case being connected, at at least one of its longitudinal ends, to at least one exhaust line of the automobile vehicle, said treatment device permitting a substantial reduction of the proportions of unburnt hydrocarbons in the exhaust gases of the engine in all the phases of operation of the engine irrespective of the temperature of the exhaust gases of the engine.

To this end, the treatment device according to the invention comprises, inside the cylindrical case of the exhaust manifold, the catalyst body in a central disposition and at least one adsorption means for adsorbing the hydrocarbons contained in the exhaust gases in a peripheral disposition around the catalyst body, so that the exhaust gases introduced by said exhaust pipe into the case flow in a whirling manner around the catalyst body in contact with the adsorption means and with an outer surface of the catalyst body.

In order to further explain the invention, there will now be described, as a non-limitative example, with reference to the accompanying drawings, several embodiments of a device according to the invention for the treatment of the exhaust gases of a petrol or gasoline engine.

In the drawings:

FIGS. 1 and 2 relate to a first embodiment of the invention.

Figure 3:
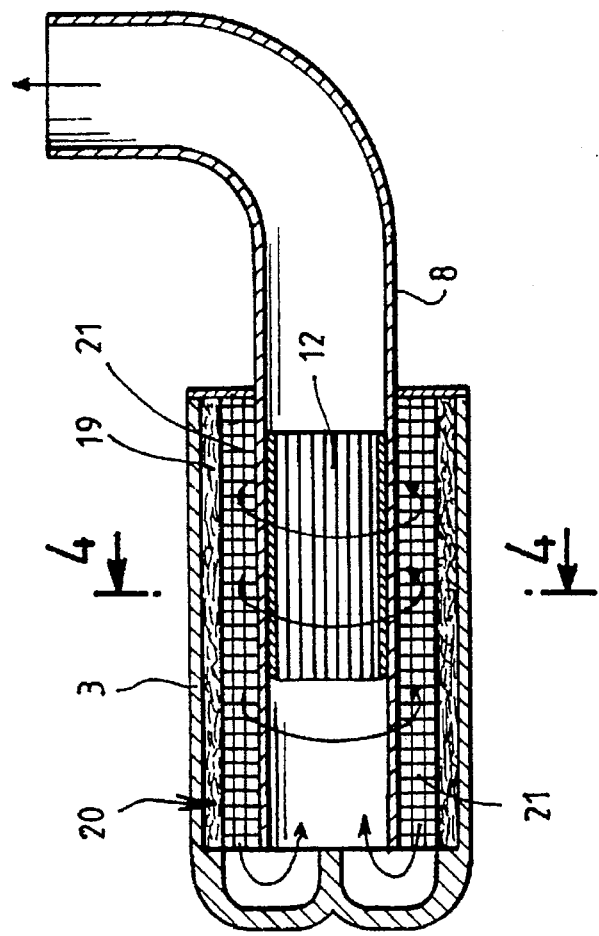
Figure 4:
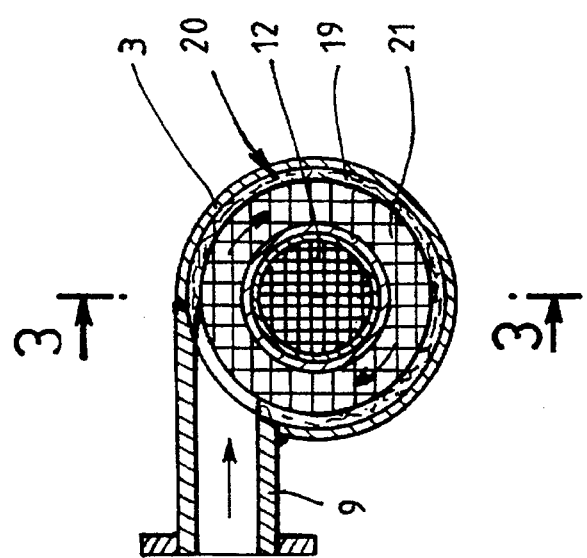

FIG. 3 and 4 relate to a second embodiment of a device according to the invention.

FIG. 3 is an axial sectional view taken on line 3—3 of FIG. 4.

FIG. 4 is a cross-sectional view taken on line 4—4 of FIG. 3.

Figure 5:
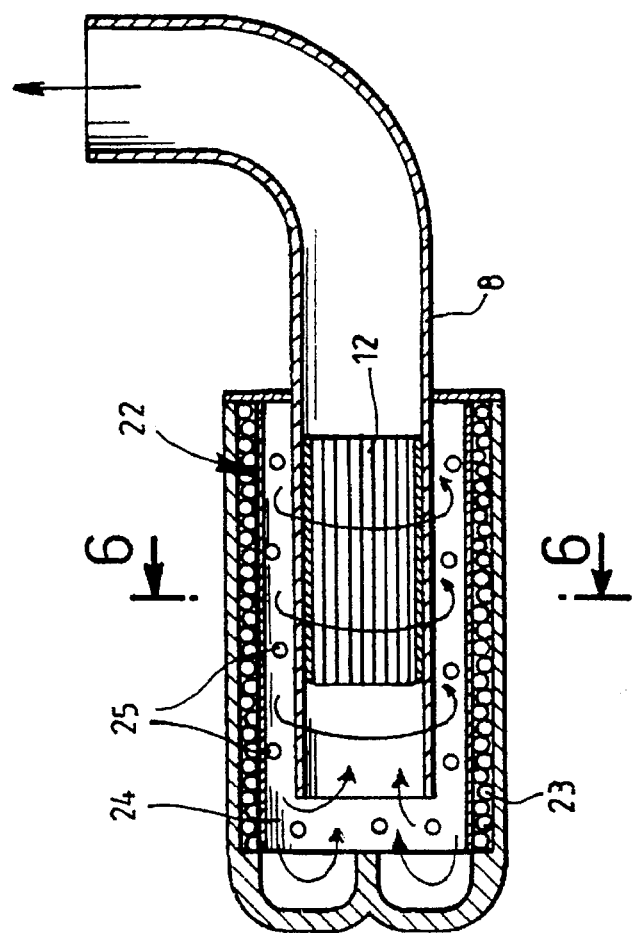
Figure 6:
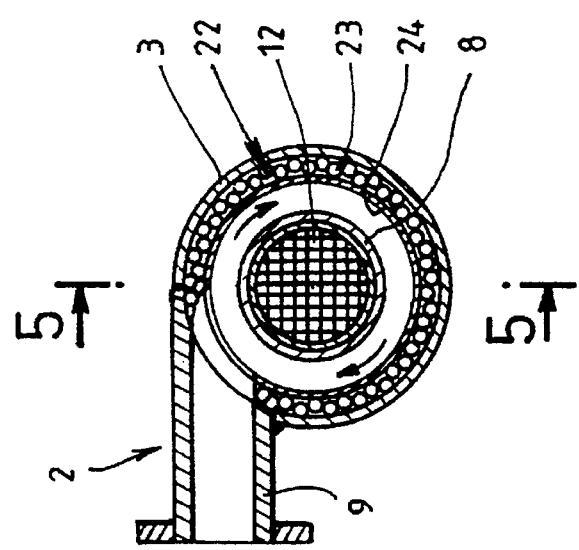

FIGS. 5 and 6 relate to a third embodiment of a treatment device according to the invention.

FIG. 5 is a longitudinal sectional view taken on line 5—5 of FIG. 6.

FIG. 6 is a cross-sectional view taken on line 6—6 of FIG. 5.

Figure 7:
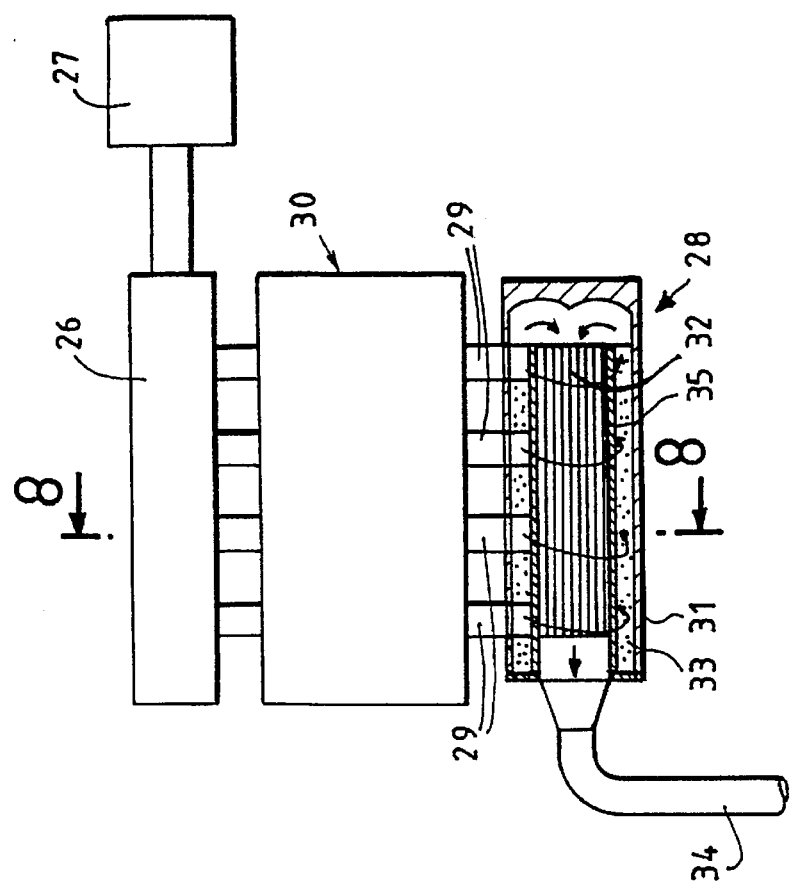

FIG. 7 is a plan view of a petrol engine equipped with a treatment device according to the invention.

Figure 8:
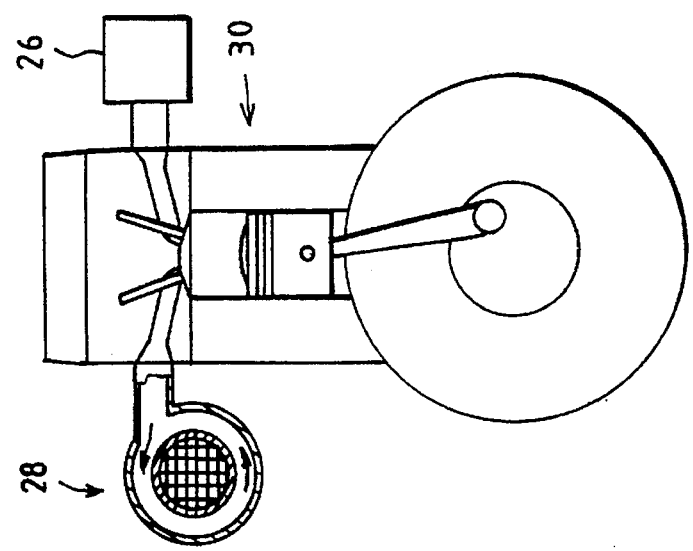

FIG. 8 is a sectional view taken on line 8—8 of FIG. 7.

Figure 9:
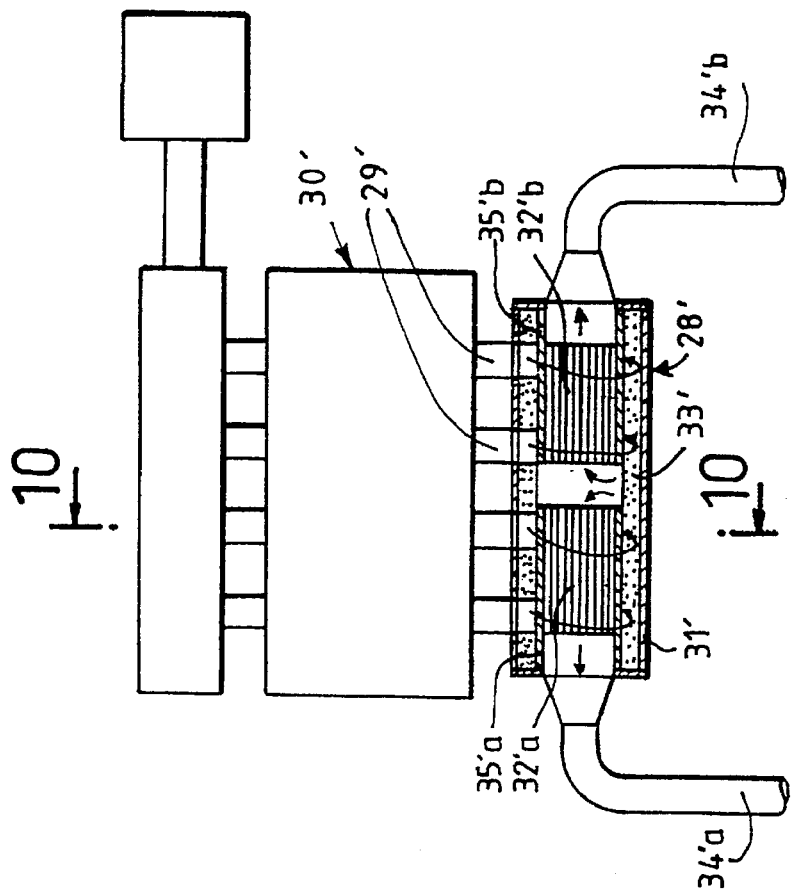

FIG. 9 is a view, partly in plan and partly in section, of a petrol engine comprising a treatment device according to the invention in an alternative embodiment.

Figure 10:
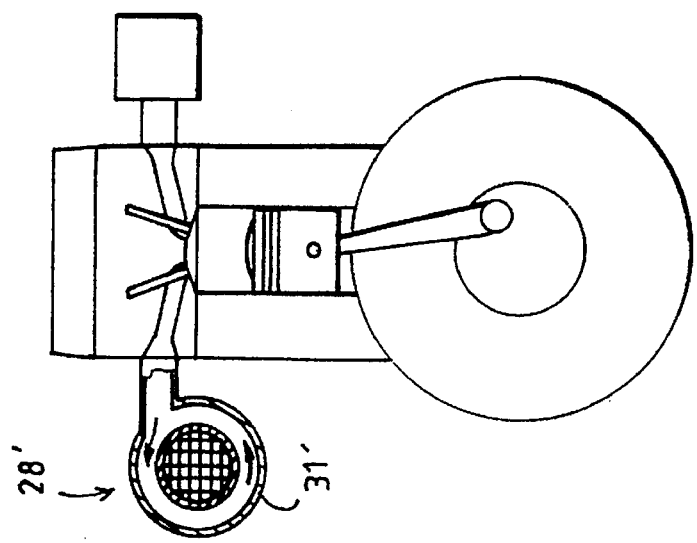

FIG. 10 is a sectional view taken on line 10—10 of FIG. 9.

Figure 1:
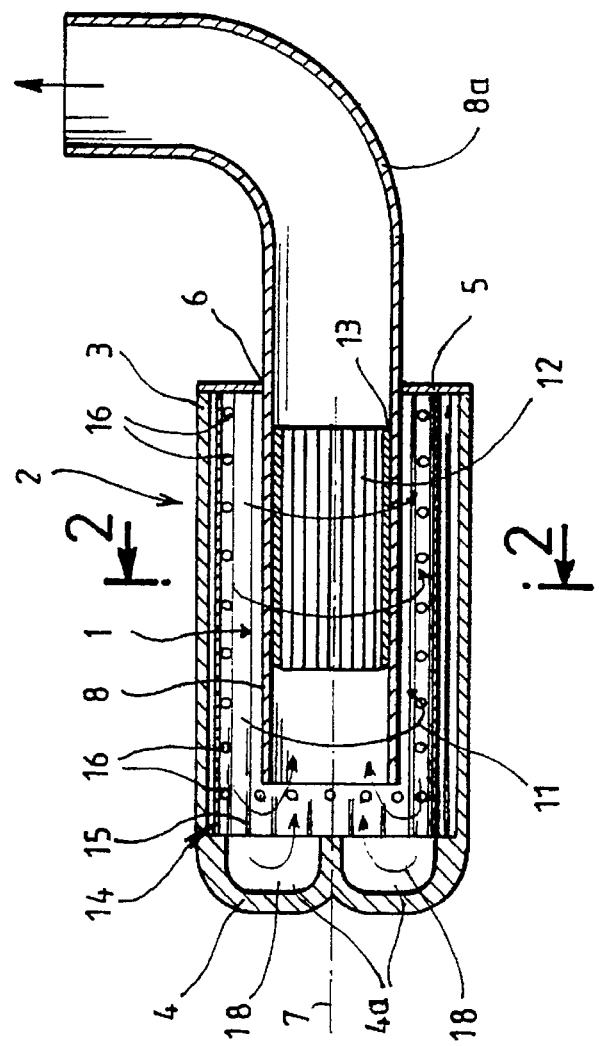
FIG. 1 is an axial sectional view taken on line 1—1 of FIG. 2.
Figure 2:
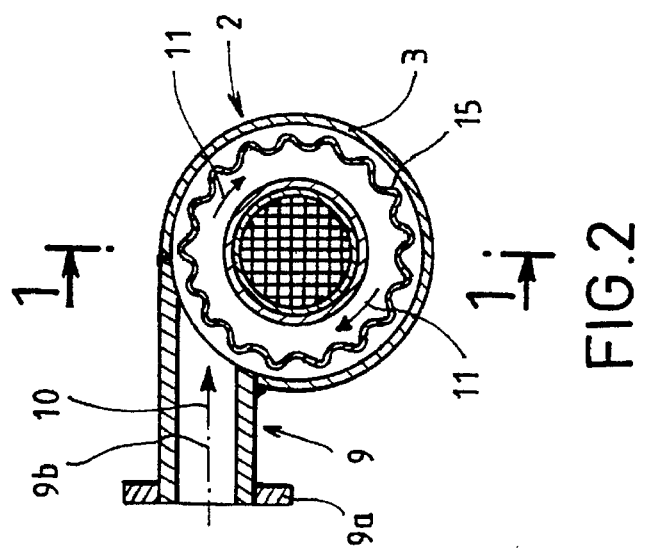
FIG. 2 is a cross-sectional view taken on line 2—2 of FIG. 1.

Shown in FIGS. 1 and 2 is a device for the treatment of an exhaust gas according to the invention generally designated by the reference numeral 1 disposed inside the exhaust manifold 2 of a petrol engine.

The exhaust manifold 2 comprises a case 3 of stainless steel of substantially cylindrical shape closed at one end by a slightly crowned or convex end wall 4, thereby defining in the case 3 a cavity 4a of substantially toric shape.

Fixed in a sealed manner on the end part of the case 3 of the manifold 2 remote from the end wall 4, is a flat end wall 5 provided with a central through opening 6 in which is engaged, in the axial direction 7 of the manifold 2, a rectilinear end part 8 of an exhaust line 8a of the automobile vehicle driven by the petrol engine. The rectilinear end part 8 of the exhaust line constituting a pipe receiving the exhaust gases inside the manifold extends in the axial direction 7 inside the case 3 of the manifold on a length a little less than the overall length of the manifold so that the end of the pipe 8 is in confronting relation and in proximity to the end wall 4 of the case 3 defining the cavity 4a.

As can be seen in FIG. 2, the case 3 of the manifold 2 comprises an opening in its upper part, in the region of which there is fixed by welding on the case 3 an exhaust pipe 9 including a flange 9a for connection to the cylinder head of the diesel engine. The pipe 9 opens onto the interior of the case 3 of the manifold 2 in a direction 9b which is substantially tangential to the cylindrical case 3. The exhaust gases of the diesel engine, which flow in the direction parallel to the axis 9b of the pipe, as indicated by the arrow 10, enter in the tangential direction the interior of the case 3 and are made to flow in the case 3 in the form of a rotating stream around the axis 7 of the case 3 of the manifold, as shown by the arrows 11.

The device for the treatment of exhaust gases according to the invention, generally designated by the reference numeral 1 and completely disposed within the case 3 of the manifold, comprises a catalyst body 12 disposed inside pipe 8 in part of the latter inserted in the manifold, and an adsorber 14 disposed around the catalyst body 12 and the pipe 8, in an annular space defined inside the case 3 of the manifold by the pipe 8.

The catalyst body 12, which may be fixed inside a cylindrical sleeve 13 of metal inserted in the pipe 8, comprises a support through which extend passages for the circulation of gases in a longitudinal direction substantially parallel to the axis 7 of the case of the manifold and on which are deposited catalyst materials such as precious metals. The catalyst body 12 constructed in one piece must permit both the conversion by oxidation of the carbon monoxide CO and of the unburnt hydrocarbons HC into the form of carbon dioxide $CO_2$ and water vapour $H_2O$ and the conversion of the nitrogen oxides $NO_x$ by reduction, into the form nitrogen $N_2$ and oxygen $O_2$. The catalyst body 12 is of the type named three-way catalyst.

Such a catalyst body is an element known in the art of the construction of catalytic silencers.

The hydrocarbons adsorber 14 may be in the form of a tubular sleeve 15 of corrugated stainless steel sheet covered with a hydrocarbons C adsorber, such as for example a zeolite or activated carbon. The tubular sleeve 15 may be constructed by rolling onto itself a corrugated stainless steel sheet covered with hydrocarbons HC adsorbing material or directly in the form of a tube of stainless steel covered externally and internally with an adsorbent material and including on its periphery a succession of axially extending corrugations.

The tubular sleeve 15 of the adsorber 14 has a length in the axial direction which is substantially equal to the distance between the flat end wall 5 and the peripheral part of the convex end wall 4 of the manifold 2. The tubular sleeve 15 of the adsorber 14 may be fixed inside the case 3 by a clamping between the end walls 5 and 4 of the manifold.

The tubular sleeve 15 of the adsorber 14 is provided with through openings 16 throughout its surface area so as to permit the exhaust gases entering the manifold to pass through the sleeve of the adsorber which is consequently permeable to the exhaust gases throughout its surface area. The exhaust gases entering the case 3 of the manifold in a tangential direction come into contact with the sleeve 15 of the adsorber 14 which is covered with a layer of an unburnt hydrocarbons adsorbing material. The openings 16 allow the gases to pass into the sleeve 15 so that the exhaust gases flowing in a whirling manner around the axis 7 of the chamber of the manifold 3, as shown by the arrows 11, can come into contact with sleeve 15 on its outer surface and on its inner surface and with the outer surface of the exhaust pipe 8 in which the catalyst body 12 is disposed. The hot gases from the engine flowing in a whirling manner consequently come into contact with the adsorber 14 and are in thermal contact with the outer surface of the catalyst body 12 which is heated by these gases.

The active surface of the case 15 is increased by the presence of the corrugations. Moreover, the corrugations favour the contact of the exhaust gases with the active surfaces b disturbing their flow. The unburnt hydrocarbons contained in the exhaust gases are in a large part adsorbed by the surfaces of the adsorber 14. The adsorption materials are so chosen that the hydrocarbons are adsorbed from the ambient temperature on. The hydrocarbons are therefore adsorbed as soon as the petrol engine is started up and during all of the initial phases of operation of the engine during which the exhaust gases are at a relatively low temperature, for example below 300° C.

Further, the exhaust gases come into contact with the outer surface of the exhaust pipe 8 in which the catalyst body is disposed. The exhaust gases therefore ensure the heating of the catalyst body 12 whose outer surface is in intimate contact with the inner surface of the pipe 8.

During the initial phases of the operation of the engine, the temperature of the catalyst body 12 gradually rises owing to the fact that it is put into thermal contact with the exhaust gases whose temperature rises.

A part of the exhaust gases flowing inside the case 3 of the manifold 2 come into contact with the surface of the cavity 4a of the end wall 4 of the manifold thereby causing the return of these gases in a direction close to the direction of the axis 7 of the case of the manifold 2.

The gases made to flow in a whirling manner inside the case 3 of the manifold 2 and reaching the end of the exhaust pipe 8 enter the exhaust pipe in the axial direction 7 and pass through the catalyst body 12.

As long as the temperature of the catalyst body 12 is lower than the initiation temperature of the three-way catalyst, the exhaust gases pass through the catalyst body 12 with no conversion of the unburnt hydrocarbons into $CO_2$ and $H_2O$.

However, owing to the fact that a large proportion of hydrocarbons of the exhaust gases is adsorbed by the surfaces of the adsorber 14, the gases discharged into the atmosphere during the initial phases of operation of the engine contain proportions of hydrocarbons which are very distinctly lower than the proportions contained in the exhaust gas leaving the engine.

The component parts of the treatment device, namely the catalyst body 12 and the adsorber 14, are so arranged that the adsorber 14 reaches its hydrocarbon desorption temperature substantially at the moment when the three-way catalyst body 12 reaches its initiation temperature for the oxidation of the hydrocarbons.

When the desorption temperature is reached, the hydrocarbons retained in the trap formed by the adsorber 14 are progressively liberated and enter, with the exhaust gases which scavenge them, the interior of the exhaust pipe 8 in which the catalyst body 12 is located. The catalyst body 12 which is at a temperature at least equal to its temperature for initiating the oxidation of the hydrocarbons, converts the hydrocarbons into $CO_2$ and $H_2O$ in a large proportion.

The gases discharged into the atmosphere contain only small quantities of unburnt hydrocarbons.

The initiation temperature of the catalyst and the desorption temperature of the adsorber are reached practically simultaneously during the rise in temperature of the exhaust gases after the starting up of the engine. This rise in temperature occurs usually after a period of of the order of 120 seconds.

The treatment device according to the invention therefore limits the hydrocarbon discharges throughout the phases of operation of the petrol engine and meets all of the strictest standards.

FIGS. 3 and 4 and FIGS. 5 and 6 show a second and a third embodiment of a treatment device according to the invention disposed inside an exhaust manifold of a petrol engine.

The second and the third embodiments of the treatment device according to the invention differ from the first embodiment only in respect of the structure and the mounting of the adsorber. Consequently, only this part of the device will be described with reference to FIGS. 3 and 4 and FIGS. 5 and 6 respectively.

Further, corresponding and identical elements in FIGS. 3 and 4 and 5 and 6 on one hand and 1 and 2 on the other hand carry the same reference numerals.

In the second embodiment shown in FIGS. 3 and 4, the adsorption means 20 comprises a layer of metal fibres 19 covered with a hydrocarbons adsorbing material maintained against the inner surface of the cylindrical case 3 of the manifold 2 by an element 21 which has an annular shape and consists of a metal netting of stainless steel wires. The annular element 21 of metal netting is mounted on the end part of the exhaust pipe 8 and has a thickness in the radial direction which enables it to maintain the layer 19 of metal fibres covered with adsorption material by a resilient clamping thereof against the inner surface of the case 3 of the manifold 2. The layer of fibres 19 has an annular shape and includes a through opening in alignment with the opening of the case 3 in which the pipe 9 is fixed.

The operation of the device shown in FIGS. 3 and 4 is substantially identical to the operation of the device shown in FIGS. 1 and 2, the exhaust gases entering the exhaust manifold coming into contact with the layer 19 of metal fibres covered with adsorbent material during their whirling flow around the axis of the chamber of the manifold. Further, the exhaust gases come into contact with the outer surface of the exhaust pipe 8 through the netting 21 and heat the catalyst body 12 through the wall of the exhaust pipe 8.

FIGS. 5 and 6 show a third embodiment of a treatment device according to the invention.

In this embodiment, the hydrocarbons adsorber 22 is formed by a layer or bed of balls 23 of alumina covered with a hydrocarbons adsorbing material maintained against the inner wall of the cylindrical case 3 of the exhaust manifold 2 by a cylindrical sleeve 24 of stainless steel placed and fixed in a coaxial position inside the chamber of the cylindrical case 3 of the manifold 2. The tubular sleeve 24 of stainless steel is provided with through openings 25 having a diameter slightly smaller than the diameter of the balls of the layer 23. Preferably, the alumina balls of the layer 23 have a diameter which may be as much as 2 to 3 mm. The layer 23 fills an annular space between the inner wall of the case 3 of the manifold and the wall of the stainless steel sleeve 24 coaxial with the case 3. The layer of balls 23 is interrupted in the region of the end of the exhaust pipe 9 opening onto the chamber of the manifold 2.

In an alternative embodiment, the layer of balls 23 may be maintained against the inner surface of the case 3 by an annular element comprising a netting of stainless steel wires similar to the annular element 21 shown in FIGS. 3 and 4, engaged on the pipe 8 which forms a sleeve enclosing the catalyst body 12.

The exhaust gases introduced into the chamber of the manifold 2 through the exhaust pipe 9 enter the layer of balls 23 of the adsorber 22 and flow inside the layer of balls in contact with the outer surface of the latter which is coated with a hydrocarbons adsorbing material. A part of the unburnt hydrocarbons contained in the exhaust gases is retained by the adsorber 22 as soon as the engine is started up, the exhaust gases being at a temperature close to the ambient temperature.

Further, the exhaust gases passing through the openings 25 enter the annular space between the sleeve 24 of stainless steel maintaining the layer of balls 23 and the exhaust pipe 8 in which the catalyst body 12 is disposed. The exhaust gases which flow in a whirling manner around the axis of the manifold in this space gradually heat the catalyst body 12 through the wall of the pipe 8 when they rise in temperature.

The operation of the device of the third embodiment is therefore identical to the operation of the device of the first and the second embodiments.

FIGS. 7 and 8 show a petrol engine generally designated by the reference numeral 30 and comprising four cylinders in line fed with intake air by an intake manifold 26 connected to an air filter 27 through four intake pipes each connected to a cylinder of the engine.

The four cylinders of the petrol engine are each connected by an exhaust pipe 29 to an exhaust manifold 28 constituting a case for a treatment device according to the invention.

The cylindrical case of the exhaust manifold 28 is so disposed that its axis is parallel to the line of cylinders of the engine 30.

Each of the exhaust pipes 29 opens into the chamber of the manifold 28, defined by a cylindrical case 31, in a tangential direction.

The case 31 of the manifold 28 is connected at one of its axial ends to an exhaust line 34 of the automobile vehicle driven by the petrol engine 30. The exhaust line 34 is extended inside the case 31 of the manifold 28 in the axial direction of the case 31 by a pipe 35 in which a catalyst body 32 is disposed.

The annular space between the pipe 35 and the inner wall of the case 31 contains a hydrocarbons adsorbing material 33.

The catalyst body 32 and the adsorbing material 33 arranged coaxially in the case 31 of the manifold 28 constitute a treatment device according to the invention such as that described with reference to FIGS. 1 to 6.

An alternative embodiment of the treatment device for the exhaust gases of a petrol engine of FIGS. 7 and 8 is shown in FIGS. 9 and 10.

Corresponding elements shown in FIGS. 9 and 10 on one hand and FIGS. 7 and 8 on the other hand are designated by the same reference numerals with the addition of ' (dash) in respect of the elements shown in FIGS. 9 and 10.

The petrol engine 30' comprises an exhaust manifold 28' having a cylindrical case 31' whose axis is parallel to the line of cylinders of the engine 30'. The exhaust pipes 29' of the engine 30' open onto the interior of the cylindrical case 31' of the manifold 28' in a tangential direction.

The manifold 28' is connected at each of its ends to an exhaust line, respectively 34'a and 34'b. The exhaust lines 34'a and 34'b are extended, inside the cylindrical case 31' of the manifold 28', by respective pipes 35'a and 35'b in which respective catalyst bodies 32'a and 32'b are disposed.

The ends of the pipes 35'a and 35'b are positioned in confronting relation to each other and at a distance from each other in the central part of the cylindrical case 31' of the manifold 28'.

The annular space between the pipes 35'a and 35'b on one hand and the inner wall of the cylindrical case 31' of the manifold 28' on the other hand contains a hydrocarbons adsorbing material 33'.

The device for the treatment of exhaust gases disposed inside the manifold 28' of the engine 30' operates in a manner similar to that of the treatment devices described hereinbefore.

The exhaust gases of the petrol engine 30' enter the chamber 31' of the manifold 28' in a tangential direction so that they form a whirling flow around the axis of the case 31'. The exhaust gases come into contact with hydrocarbons adsorber 33' and with the outer surface of the pipes 35'a and 35'b so that they heat the catalyst bodies 32'a and 32'b.

The exhaust gases from which a part of the hydrocarbons has been removed by the passage through the adsorber 33' reach the central region of the case 31' of the manifold 28' between the catalyst bodies 32'a and 32'b. The exhaust gases reaching the central part of the chamber of the manifold are divided into two streams which flow through respectively the catalyst body 32'a inside the pipe 35'a and the catalyst body 32'b inside the pipe 35'b, and issue from the exhaust manifold 28' through the exhaust lines 34'a and 34'b respectively.

In every case, the treatment device according to the invention permits avoiding large discharges of hydrocarbons into the atmosphere irrespective of the phase of operation of a petrol engine.

It must be understood that the scope of the invention is not intended to be limited to the described embodiments.

Thus, it may be envisaged to construct the hydrocarbons adsorber in a form different from those described and to maintain the adsorber on the periphery of the chamber of the exhaust manifold also in a different way.

Depending on the available space in the engine compartment of the vehicle, the exhaust manifold in which the exhaust gas treatment device is disposed may enclose a plurality of units each comprising an adsorbing element and a catalyst body in coaxial arrangements. The gas treatment units arranged coaxially and formed by an adsorber and a catalyst body may be arranged in opposition inside the case of the manifold as shown in FIG. 9, when the manifold is connected to two opposed exhaust lines. These units may also be arranged superimposed or in parallel in the case of the exhaust manifold.

Special arrangements for the units of the gas treatment device may be required, for example to tune the exhaust between the cylinders of an engine.

The unburnt hydrocarbons adsorber disposed in a peripheral position inside the manifold may be arranged in such manner as to not only trap hydrocarbons but also trap other polluting substances contained in the exhaust gases, such as nitrogen oxides.

The invention is applicable to any petrol engine comprising a manifold which is connected to an exhaust line and into which the exhaust pipes of the engine open in a tangential direction.

What is claimed is:

1. Device for the treatment of the exhaust gases of a spark-ignition engine of an automobile vehicle, said device comprising in combination: a cylindrical case of an exhaust manifold of said engine, a catalyst body disposed in a central position in said case, an exhaust pipe for communication with a cylinder of said engine and connected to said case in such manner as to open onto the interior of said case in a substantially tangential direction, an exhaust line of said automobile vehicle connected to an axial end of said case, adsorption means for adsorbing hydrocarbons of said exhaust gases in a peripheral disposition around said catalyst body, whereby said exhaust gases introduced by said exhaust pipe into said case flow in a whirling manner around said catalyst body and in contact with said adsorption means and with an outer surface of said catalyst body.

2. Device for the treatment of the exhaust gases of a spark-ignition engine of an automobile vehicle, said device comprising in combination: a cylindrical case of an exhaust manifold of said engine, at least one catalyst body disposed in a central position in said case, a plurality of exhaust pipes for communication with respective cylinders of said engine and connected to said case in such manner as to open onto the interior of said case in substantially tangential directions, at least one exhaust line of said automobile vehicle connected to a respective axial end of said case, at least one adsorption means for adsorbing hydrocarbons of said exhaust gases in a peripheral disposition around said at least one catalyst body, whereby said exhaust gases introduced by said exhaust pipes into said case flow in a whirling manner around said at least one catalyst body and in contact with said at least one adsorption means and with an outer surface of said at least one catalyst body.

3. Device according to claim 1, comprising a pipe constituting an end part of said exhaust line disposed inside said case, said catalyst body being disposed inside said pipe constituting said end part of said exhaust line, said pipe constituting said end part of said exhaust line defining an annular peripheral space with said case, said adsorption means being disposed in said annular peripheral space.

4. Device for the treatment of exhaust gases of a spark-ignition engine of an automobile vehicle, said device comprising in combination: a cylindrical case of an exhaust manifold of said engine, a catalyst body disposed in a central position in said case, an exhaust pipe for communication with a cylinder of said engine and connected to said case in such manner as to open onto the interior of said case in a substantially tangential direction, an exhaust line of said automobile vehicle connected to an axial end of said case, adsorption means for adsorbing hydrocarbons of said exhaust gases in a peripheral disposition around said catalyst body, whereby said exhaust gases introduced by said exhaust pipe into said case flow in a whirling manner around said catalyst body and in contact with said adsorption means and with an outer surface of said catalyst body, wherein said adsorption means for adsorbing said hydrocarbons comprises a tubular sleeve of sheet metal coated with at least one hydrocarbons adsorbing means and placed in said case in a substantially coaxial position relative to said case.

5. Device according to claim 4, wherein said sheet metal is a corrugated sheet metal the corrugations of which extend in a direction parallel to the axis of said sleeve and of said case.

6. Device according to claim 4, wherein said tubular sleeve disposed around said catalyst body comprises a plurality of through openings arranged on the whole of the surface area thereof.

7. Device for the treatment of exhaust gases of a spark-ignition engine of an automobile vehicle, said device comprising in combination: a cylindrical case of an exhaust manifold of said engine, a catalyst body disposed in a central position in said case, an exhaust pipe for communication with a cylinder of said engine and connected to said case in such manner as to open onto the interior of said case in a substantially tangential direction, an exhaust line of said automobile vehicle connected to an axial end of said case, adsorption means for adsorbing hydrocarbons of said exhaust gases in a peripheral disposition around said catalyst body, whereby said exhaust gases introduced by said exhaust pipe into said case flow in a whirling manner around said catalyst body and in contact with said adsorption means and with an outer surface of said catalyst body, wherein said means for adsorbing said hydrocarbons comprise an annular layer of metallic fibres coated with at least one hydrocarbon adsorbing material, said device further comprising a maintaining device cooperative with said layer for maintaining said layer against an inner surface of said case.

8. Device according to claim 7, wherein said maintaining device comprises an element of annular shape comprising a netting of stainless steel wires and engaged on a pipe enclosing said catalyst body.

9. Device for the treatment of exhaust gases of a spark-ignition engine of an automobile vehicle, said device comprising in combination: a cylindrical case of an exhaust manifold of said engine, a catalyst body disposed in a central position in said case, an exhaust pipe for communication with a cylinder of said engine and connected to said case in such manner as to open onto the interior of said case in a substantially tangential direction, an exhaust line of said automobile vehicle connected to an axial end of said case, adsorption means for adsorbing hydrocarbons of said exhaust gases in a peripheral disposition around said catalyst body, whereby said exhaust gases introduced by said exhaust pipe into said case flow in a whirling manner around said catalyst body and in contact with said adsorption means and with an outer surface of said catalyst body, wherein said means for adsorbing said hydrocarbons comprise a layer of balls coated with a coating of at least one hydrocarbons adsorbing material, said layer of balls being of annular shape, said device further comprising maintaining means fixed inside said case for maintaining said layer of balls against an inner surface of said case.

10. Device according to claim 9, wherein said maintaining means comprise a tubular sleeve of metal provided with through openings having a diameter less than the diameter of said balls of said layer.

11. Device according to claim 10, wherein said metal of said tubular sleeve is stainless steel.

12. Device according to claim 10, wherein said tubular sleeve is fixed in said case in a coaxial position relative to said case.

13. Device according to claim 9, wherein said maintaining means comprise an element of annular shape comprising a netting of stainless steel wires fixed inside said case by engagement on a case enclosing said catalyst body.

14. Device according to claim 9, wherein said balls of said layer are of alumina.

15. Device according to claim 2, for combination with a spark-ignition engine comprising a plurality of cylinders in line, wherein said cylindrical case has an axis parallel to said line of cylinders.

16. Device according to claim 15, wherein a second of said at least one catalyst body is provided and two of said at least one exhaust line are connected to opposite axial ends of said case, each exhaust line being extended inside said case by a pipe enclosing a respective one of said two catalyst bodies, said two catalyst bodies and said pipes enclosing a respective one of said catalyst bodies having ends inside said case which are in facing relation to each other and spaced apart from each other in the vicinity of an axially central part of said case.

17. Device according to claim 16, wherein said at least one adsorption means is disposed inside said case and around said pipes enclosing said catalyst bodies.

18. Device according to claim 1, wherein the exhaust gases introduced by the exhaust pipe into the case are in contact with the adsorption means and with the outer surface of the catalyst body such that the adsorption means and the catalyst body are heated by the exhaust gases and reach substantially simultaneously a desorption temperature and an operating temperature, respectively.

19. Device according to claim 2, wherein the exhaust gases introduced by the plurality of exhaust pipes into the case are in contact with the at least one adsorption means and with the outer surface of the at least one catalyst body such that the at least one adsorption means and the at least one catalyst body are heated by the exhaust gases and reach substantially simultaneously a desorption temperature and an operating temperature, respectively.

20. Device according to claim 5, wherein said tubular sleeve disposed around said catalyst body comprises a plurality of through openings arranged on the whole of the surface area thereof.

* * * * *